United States Patent [19]

Gautier

[11] Patent Number: 5,067,392

[45] Date of Patent: Nov. 26, 1991

[54] PNEUMATIC BOOSTER

[75] Inventor: Jean-Pierre Gautier, Aulnay sous Bois, France

[73] Assignee: Bendix Europe Services Techniques, Drancy, France

[21] Appl. No.: 568,149

[22] Filed: Aug. 16, 1990

[30] Foreign Application Priority Data

Sep. 5, 1989 [FR] France .................. 89 11565

[51] Int. Cl.⁵ .................. F01B 19/00; F16J 3/00
[52] U.S. Cl. .................. 92/98 D; 92/98 R; 92/165 R; 92/165 PR
[58] Field of Search .................. 92/96, 97, 98 R, 99, 92/100, 165 R, 165 PR, 98 D

[56] References Cited

U.S. PATENT DOCUMENTS

| 3,026,853 | 3/1962 | Stelzer | 92/99 X |
| 3,321,915 | 5/1967 | Martin . | |
| 3,387,540 | 6/1968 | Wilson | 92/99 X |
| 3,556,609 | 1/1971 | MacDuff . | |
| 4,070,946 | 1/1978 | Sandvik et al. . | |
| 4,328,738 | 5/1982 | Hamamatsu | 92/99 X |

FOREIGN PATENT DOCUMENTS 2751430 5/1979 Fed. Rep. of Germany .

Primary Examiner—Edward K. Look
Assistant Examiner—Hoang Nguyen
Attorney, Agent, or Firm—Larry J. Palguta; Ken C. Decker

[57] ABSTRACT

The pneumatic booster of the vacuum type comprises mainly a housing (12) divided into two chambers (7, 8) by a movable wall structure (6), constructed of a substantially radial plate (9) and a flexible diaphragm (10) secured by its outer peripheral edge to the housing (12), and forming a flange (11) in the space between the plate (9) and the housing (12). The plate is centrally integral with a hub structure housing, a distribution valve device and linked to a control member and to a controlled member, each by a swivel connection. The plate (9) has at its outer edge an extension (13) cooperating in a non-leaktight manner with the internal wall of the housing (12) in order to ensure axial guidance of the movable wall (6) inside the housing (12).

2 Claims, 1 Drawing Sheet

PNEUMATIC BOOSTER

BACKGROUND OF THE INVENTION

The present invention relates to pneumatic boosters of the vacuum type comprising mainly a housing divided into two chambers by a movable wall structure, constructed of a substantially radial plate and a flexible diaphragm secured by its outer peripheral edge to the housing and forming a flange in the space between the plate and the housing, the plate being integral centrally with a hub structure housing a distribution valve device, and linked to a control member and to a controlled member, each by a swivel connection.

A booster of this type finds its application mainly in assisting the braking of automotive vehicles. In this application, the functioning of a booster of this type is well known and may therefore be explained briefly as follows: in the state of rest, the two chambers are connected to a source of reduced pressure; in the braking state, air under atmospheric pressure is admitted into one of the chambers; the difference in pressure between the two chambers then causes displacement of the movable wall and, as a result, assists braking.

U.S. Letters Pat. No. 4,117,769 describes a pneumatic brake booster in which a diaphragm is supported by a rigid plate allowing the extension thereof in the direction of displacement of the movable wall constructed of said plate and said diaphragm; during said displacement, said movable wall is not guided perfectly in the housing and, because of the swivel connections, the plate may become positioned askew and damage the diaphragm.

It is therefore an object of the present invention to obviate this drawback by providing a system which allows guidance of the movable wall inside the housing so as not to damage the diaphragm.

U.S. Letters Pat. No. 4,070,946 discloses a compressed-air screw jack in which the tubular piston has a guide skirt cooperating with the internal wall of the housing. In fact, the controlled member is not integral with the tubular piston which therefore has to be appropriately centered.

However, said elongated tubular piston is not subjected to forces which would cause it to become positioned askew, since it is not arranged between two swivel connections, and does not receive any control member which might apply an oblique force on it.

SUMMARY OF THE INVENTION

In order to achieve the object of the invention, according to a feature thereof, the plate has at its outer edge an extension cooperating in a non-leaktight manner with the internal wall of the housing in order to ensure axial guidance of the movable wall inside the housing. This extension is constructed either of a perforated cylindrical skirt or of a plurality of fingers.

BRIEF DESCRIPTION OF THE DRAWINGS

The invention will be better understood and other objects, advantages and features will emerge more clearly from the description which follows of a preferred embodiment given as a non-limiting example, with reference to the accompanying drawing, in which.

DETAILED DESCRIPTION OF THE INVENTION

Figure 1:
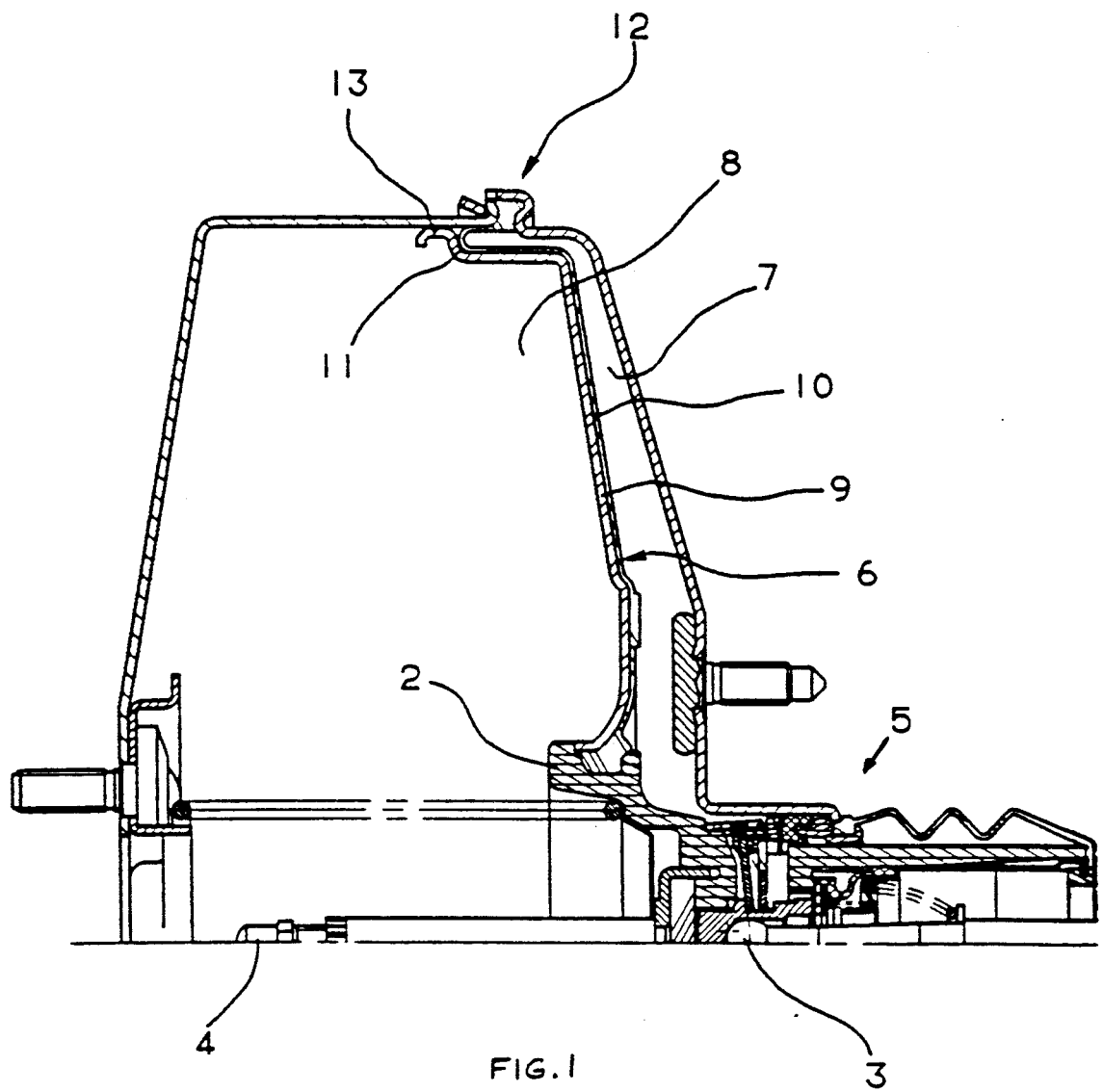
FIG. 1 is a view in partial half-section of a pneumatic brake booster according to the invention.

In the FIG. 1, a pneumatic brake booster is illustrated in half-section, the main constituent elements and operation of which are assumed to be known to the person skilled in the art: a movable wall structure 6 constructed of an assembly of a metal plate 9 which is substantially arranged in a radial plane and a flexible diaphragm 10 separates a housing 12 into two chambers 7, 8 inside which different pressures are established when a braking action occurs in order to cause the displacement of the movable wall 6 and, as a result, create braking assistance.

In known manner, the plate 9 is integral with a hub 2, generally of plastic material, which is linked to a control member 3 by a swivel connection. Said control member 3 also determines the state of a distribution valve device 5 enabling different pressures to be obtained in the chambers 7 and 8. The hub is likewise integral with a push rod 4 having a ball-shaped end bearing on the input piston of a master cylinder (not shown).

The flexible diaphragm 10 is secured by its inner peripheral edge to the metal plate 9 and by its outer peripheral edge to the housing 12, and exhibits a fold 11 enabling it to unfold during the movement of the plate 9.

According to the invention, the plate 9 has at its outer edge an extension 13 cooperating with the internal wall of the housing 12 in order to create a guidance zone for the movable wall.

During a braking action, the movable wall 9-10 moves and the diaphragm 10 becomes deformed mainly in the direction of displacement of the plate 9; the extension 13 will make it possible to guide the movable wall 9-10 inside the housing 12 and consequently to prevent any deterioration of the diaphragm.

In the embodiment illustrated in FIG. 1, the extension and the plate form one and the same part. Nevertheless, the extension 13 may be a separate part.

The extension 13 may be constructed either of a perforated skirt or of a plurality of fingers. In fact, it is essential that, when the booster is in operation, a third chamber is not created between the extension 13 and the fold 11 of the diaphragm 10, in which the pressure would be different from that prevailing in the chamber 8. In such a case, the fold 11 of the diaphragm 10 would not naturally resume at rest the position shown and slapping would be felt when the chamber 7 was pressurized, which would tend to cause the diaphragm 10 to break up.

Figure 2:
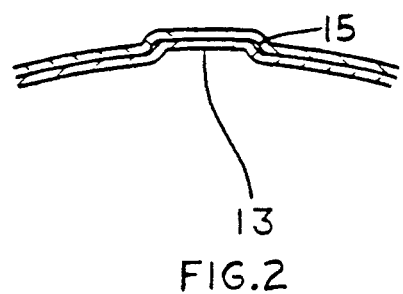
FIG. 2 is a section view of one of a plurality of movable wall fingers which is guided in a groove in the housing.

Furthermore, to prevent any rotation of the plate, it is advantageous, where the extension 13 is constructed of a plurality of fingers, to make at least one groove 15 in the internal wall of the housing 12 as shown in FIG. 2, a groove in which one of the fingers (as illustrated) of the extension 13 will engage.

What we claim is:

1. A pneumatic booster of the vacuum type, comprising a housing divided into two chambers by a movable wall structure comprising a substantially radial plate and a flexible diaphragm which is secured by an outer peripheral edge to said housing and forming a fold in a space between said plate and housing, said plate being centrally connected with a hub structure housing a distribution valve device and linked to a control member and to controlled member, said plate having at an outer edge thereof an extension cooperating in a non-leaktight manner with an internal wall of said housing in order to ensure axial guidance of said movable wall inside said housing, said extension being constructed of a plurality of fingers with at least one of said fingers engaging in a groove in said internal wall to prevent rotation of said plate.

2. The pneumatic brake booster according to claim 1, wherein said one finger and plate are integral with one another.

* * * * *